US009845026B2

(12) United States Patent
Pereny et al.

(10) Patent No.: US 9,845,026 B2
(45) Date of Patent: Dec. 19, 2017

(54) ADJUSTABLE SEAT ASSEMBLY

(71) Applicant: Lear Corporation, Southfield, MI (US)

(72) Inventors: Michelle A. Pereny, Farmington Hills, MI (US); Karl Henn, New Hudson, MI (US); Samuel R. Hanlon, Livonia, MI (US); Gerald Patrick, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 188 days.

(21) Appl. No.: 14/716,191

(22) Filed: May 19, 2015

(65) Prior Publication Data

US 2016/0339801 A1    Nov. 24, 2016

(51) Int. Cl.

| | | |
|---|---|---|
| *G05B 19/402* | (2006.01) | |
| *B60N 2/02* | (2006.01) | |
| *B60N 2/06* | (2006.01) | |
| *B60N 2/22* | (2006.01) | |
| *B60N 2/44* | (2006.01) | |
| *B60N 2/66* | (2006.01) | |

(52) U.S. Cl.
CPC ............ *B60N 2/0244* (2013.01); *B60N 2/06* (2013.01); *B60N 2/22* (2013.01); *B60N 2/4415* (2013.01); *B60N 2/4492* (2015.04); *B60N 2/665* (2015.04); *G05B 19/402* (2013.01); *B60N 2002/0268* (2013.01); *G05B 2219/45022* (2013.01)

(58) Field of Classification Search
CPC .................................................. G05B 19/402
USPC ............................................. 318/3, 34, 558
See application file for complete search history.

(56) References Cited

U.S. PATENT DOCUMENTS

| | | | |
|---|---|---|---|
| 4,477,874 | A | 10/1984 | Ikuta et al. |
| 4,679,855 | A | 7/1987 | Hattori et al. |
| 5,019,759 | A | 5/1991 | Takemura et al. |
| 5,707,109 | A | 1/1998 | Massara et al. |
| 5,967,608 | A | 10/1999 | Van Sickle |

(Continued)

FOREIGN PATENT DOCUMENTS

| | | |
|---|---|---|
| CN | 1087804 A | 6/1994 |
| CN | 101161500 A | 4/2008 |

(Continued)

OTHER PUBLICATIONS

U.S. Appl. No. 14/560,436, entitled "Adjustable Seat Assembly", filed Dec. 4, 2014, 19 pages.

(Continued)

*Primary Examiner* — David S Luo
(74) *Attorney, Agent, or Firm* — Brooks Kushman P.C.

(57) ABSTRACT

A seat assembly is provided with a seat cushion adapted to be mounted for translation. A seat back is adapted to be pivotally mounted adjacent the seat cushion. At least one actuator is operably connected to at least one of the seat cushion and the seat back for adjustment of at least one of a plurality of settings of the seat assembly. A controller is in electrical communication with the at least one actuator and configured to: receive a data input indicative of occupant anthropometry data, receive a mode selection input indicative of a selected seat positioning mode, compare the data input with predetermined data ranges for the selected seat positioning mode, and adjust at least one of the plurality of settings of the at least one actuator to a predetermined setting based on the predetermined data range.

20 Claims, 6 Drawing Sheets

(56) References Cited

U.S. PATENT DOCUMENTS

| | | |
|---|---|---|
| 5,975,633 A | 11/1999 | Walk et al. |
| 6,088,642 A | 7/2000 | Finkelstein et al. |
| 6,088,643 A | 7/2000 | Long et al. |
| 6,129,419 A | 10/2000 | Neale |
| 6,203,105 B1 | 3/2001 | Rhodes, Jr. |
| 6,220,667 B1 | 4/2001 | Wagner |
| 6,227,563 B1 | 5/2001 | Talisman |
| 6,273,810 B1 | 8/2001 | Rhodes, Jr. et al. |
| 6,289,538 B1 | 9/2001 | Fidge |
| 6,392,550 B1 | 5/2002 | Najor |
| 6,398,303 B1 | 6/2002 | Herrmann et al. |
| 6,578,916 B2 | 6/2003 | Longhi et al. |
| 6,592,533 B1 | 7/2003 | Yonekawa et al. |
| 6,682,059 B1 | 1/2004 | Daniels et al. |
| 7,131,697 B2 | 11/2006 | Beermann et al. |
| 7,152,920 B2 | 12/2006 | Sugiyama et al. |
| 7,537,286 B2 | 5/2009 | Walker et al. |
| 7,663,502 B2 * | 2/2010 | Breed ............... B60C 11/24 340/12.25 |
| 7,797,771 B1 | 9/2010 | Bossen et al. |
| 7,865,375 B2 | 1/2011 | Lancaster et al. |
| 7,917,264 B2 | 3/2011 | Hozumi et al. |
| 7,967,379 B2 | 6/2011 | Walters et al. |
| 8,054,203 B2 * | 11/2011 | Breed ............... B60C 11/24 340/425.5 |
| 8,251,447 B2 | 8/2012 | Fujita et al. |
| 8,348,339 B2 | 1/2013 | Onuma et al. |
| 8,474,908 B2 | 7/2013 | Petzel et al. |
| 8,596,716 B1 | 12/2013 | Caruso |
| 8,616,654 B2 | 12/2013 | Zenk et al. |
| 8,690,249 B2 | 4/2014 | Kang et al. |
| 8,775,018 B2 | 7/2014 | Uenuma et al. |
| 8,931,837 B2 | 1/2015 | Vernon |
| 8,958,955 B2 | 2/2015 | Hotary et al. |
| 9,049,937 B2 | 6/2015 | Walker |
| 9,381,840 B2 | 7/2016 | Tobata et al. |
| 2002/0056709 A1 | 5/2002 | Burt |
| 2002/0089220 A1 | 7/2002 | Achleitner et al. |
| 2002/0096915 A1 | 7/2002 | Haupt et al. |
| 2002/0167486 A1 | 11/2002 | Tan et al. |
| 2003/0023363 A1 | 1/2003 | Katz et al. |
| 2003/0080699 A1 | 5/2003 | Rumney |
| 2003/0226399 A1 | 12/2003 | Clingerman et al. |
| 2005/0067868 A1 | 3/2005 | Kern et al. |
| 2006/0061315 A1 | 3/2006 | Schmidt et al. |
| 2006/0103193 A1 | 5/2006 | Kramer |
| 2006/0290175 A1 | 12/2006 | Hartwich |
| 2007/0106188 A1 | 5/2007 | Walker |
| 2008/0009989 A1 | 1/2008 | Kim et al. |
| 2008/0116730 A1 | 5/2008 | Connolly et al. |
| 2008/0255731 A1 | 10/2008 | Mita et al. |
| 2008/0267460 A1 | 10/2008 | Aoki et al. |
| 2008/0277985 A1 | 11/2008 | Petzel |
| 2009/0026821 A1 | 1/2009 | Macht et al. |
| 2009/0030578 A1 | 1/2009 | Periot et al. |
| 2009/0058661 A1 | 3/2009 | Gleckler et al. |
| 2009/0088930 A1 | 4/2009 | Ohtsubo et al. |
| 2009/0099490 A1 | 4/2009 | Durt et al. |
| 2009/0107258 A1 | 4/2009 | Saitoh et al. |
| 2010/0045087 A1 | 2/2010 | Pyun et al. |
| 2010/0244504 A1 | 9/2010 | Colja et al. |
| 2010/0276973 A1 | 11/2010 | Zenk et al. |
| 2010/0283299 A1 | 11/2010 | Onuma et al. |
| 2011/0031788 A1 | 2/2011 | Kosik et al. |
| 2011/0112449 A1 | 5/2011 | Hopf et al. |
| 2011/0210590 A1 | 9/2011 | Mori et al. |
| 2012/0053794 A1 | 3/2012 | Alcazar et al. |
| 2012/0086249 A1 | 4/2012 | Hotary et al. |
| 2012/0096960 A1 | 4/2012 | Galbreath et al. |
| 2012/0259248 A1 | 10/2012 | Receveur |
| 2012/0283929 A1 | 11/2012 | Wakita et al. |
| 2013/0009761 A1 | 1/2013 | Horseman |
| 2013/0090816 A1 | 4/2013 | Huber |
| 2013/0166078 A1 | 6/2013 | Heger et al. |
| 2013/0175838 A1 | 7/2013 | Oshima et al. |
| 2013/0251216 A1 | 9/2013 | Smowton et al. |
| 2013/0313871 A1 | 11/2013 | Shalaby et al. |
| 2014/0163333 A1 | 6/2014 | Horseman |
| 2014/0167463 A1 | 6/2014 | Sakata et al. |
| 2014/0319895 A1 | 10/2014 | Lange-Mao et al. |
| 2014/0361590 A1 | 12/2014 | Line et al. |
| 2015/0008710 A1 | 1/2015 | Young et al. |
| 2015/0084985 A1 | 3/2015 | Baudu |
| 2015/0097400 A1 | 4/2015 | Heys |
| 2015/0099245 A1 | 4/2015 | Bouchard et al. |
| 2015/0136146 A1 | 5/2015 | Hood et al. |
| 2015/0367751 A1 | 12/2015 | Lamesch et al. |
| 2016/0101710 A1 | 4/2016 | Bonk et al. |
| 2016/0297337 A1 | 10/2016 | White et al. |

FOREIGN PATENT DOCUMENTS

| | | |
|---|---|---|
| CN | 101374695 A | 2/2009 |
| CN | 201329822 Y | 10/2009 |
| CN | 101731862 A | 6/2010 |
| CN | 201646470 U | 11/2010 |
| CN | 101992708 A | 3/2011 |
| CN | 102015362 A | 4/2011 |
| CN | 102099227 A | 6/2011 |
| CN | 104252615 A | 12/2014 |
| DE | 19908655 C1 | 8/2000 |
| DE | 10331624 B3 | 4/2005 |
| DE | 10353020 A1 | 6/2005 |
| DE | 102005034069 A1 | 1/2007 |
| DE | 102005038289 B3 | 3/2007 |
| DE | 102006036532 A1 | 2/2008 |
| DE | 102009021532 A1 | 11/2010 |
| DE | 102011010210 A1 | 12/2011 |
| DE | 102010056568 A1 | 7/2012 |
| DE | 102012216869 A1 | 3/2014 |
| DE | 102012216178 A1 | 5/2014 |
| EP | 0489310 A1 | 6/1992 |
| EP | 2353928 A1 | 8/2011 |
| EP | 2353928 B1 | 9/2014 |
| FR | 2988051 A1 | 9/2013 |
| FR | 2988654 A1 | 10/2013 |
| FR | 2994073 A1 | 2/2014 |
| GB | 2370222 A | 6/2002 |
| GB | 2523584 B | 1/2016 |
| TW | 477405 U | 5/2014 |
| WO | 2005074754 A1 | 8/2005 |
| WO | 2011144280 A1 | 11/2011 |
| WO | 2012159688 A1 | 11/2012 |
| WO | 2013144498 A1 | 10/2013 |
| WO | 2013170335 A1 | 11/2013 |
| WO | 2014066493 A2 | 5/2014 |
| WO | 2014085302 A1 | 6/2014 |

OTHER PUBLICATIONS

U.S. Appl. No. 14/716,197, entitled "Adjustable Seat Assembly", filed May 19, 2015, 22 pages.

U.S. Appl. No. 14/560,487, entitled "Adjustable Seat Assembly", filed Dec. 4, 2014, 16 pages.

U.S. Appl. No. 14/575,474, entitled "Adjustable Seat Assembly", filed Dec. 18, 2014, 26 pages.

U.S. Appl. No. 14/869,093, entitled "Air Bladder Assembly for Seat Bottoms of Seat Assemblies", filed Sep. 29, 2015, 14 pages.

U.S. Appl. No. 14/987,026, entitled "Seat Assemblies With Adjustable Side Bolster Actuators", filed Jan. 4, 2016, 15 pages.

* cited by examiner

QUESTIONNAIRE

*REQUIRED FIELD

| Your Name | |
|---|---|
| Gender | ■ Male   ☐ Female |
| Height (ft,in) * | 5' 6" ▼ |

Do you now, or have you in the past, experienced problems or issues in:

| Neck | ☐ Now | ☐ In the past |
|---|---|---|
| Upper Back | ☐ Now | ☐ In the past |
| Mid Back | ☐ Now | ☐ In the past |
| Lower Back | ☐ Now | ☐ In the past |

How often do you drive your primary vehicle?  [Often, 4 to 6 days per... ▼]

[ CANCEL ]   [ CONTINUE ]

FIG. 5

ADJUSTABLE SEAT ASSEMBLY

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

According to at least one embodiment, a seat assembly is provided with a seat cushion adapted to be mounted for translation. A seat back is adapted to be pivotally mounted adjacent the seat cushion. At least one actuator is operably connected to at least one of the seat cushion and the seat back for adjustment of at least one of a plurality of settings of the seat assembly. A controller is in electrical communication with the at least one actuator and configured to: receive a data input indicative of occupant anthropometry data, receive a mode selection input indicative of a selected seat positioning mode, compare the data input with predetermined data ranges for the selected seat positioning mode, and adjust at least one of the plurality of settings of the at least one actuator to a predetermined setting based on the predetermined data range.

According to at least another embodiment, a seat assembly is provided with a seat cushion and a seat back adapted to be mounted adjacent the seat cushion. A plurality of sensors is operably connected to the seat back to detect a seating position of an occupant. At least one actuator is operably connected to at least one of the seat back lower region and the seat back upper region for adjustment of at least one of a plurality of settings of the seat assembly. A controller is in electrical communication with the plurality of sensors and the at least one actuator. The controller is configured to: receive detection data from the plurality of sensors, compare the detection data to predetermined wellness positioning ranges preselected for posture alignment of ranges of occupant anthropometry data to determine if the occupant is seated according to a prescribed wellness position, and adjust the at least one actuator to adjust an occupant seating position to the prescribed wellness position.

According to at least another embodiment, a seat assembly is provided with a seat cushion adapted to be mounted for translation. A seat back is adapted to be pivotally mounted adjacent the seat cushion. A plurality of sensors is operably connected to at least one of the seat cushion and the seat back to detect a seating position of an occupant. At least one actuator is operably connected to at least one of the seat cushion and the seat back for adjustment of at least one of a plurality of settings of the seat assembly. A controller is in electrical communication with the plurality of sensors and the at least one actuator. The controller is configured to: receive an occupant data input indicative of occupant anthropometry data, receive a mode selection input indicative of a selected wellness seat positioning mode, compare the occupant data input with predetermined wellness positioning ranges preselected for posture alignment of ranges of occupant anthropometry data for the selected seat positioning mode, adjust at least one of the plurality of settings of the at least one actuator to a predetermined setting for a prescribed seating position based on the predetermined wellness positioning range, receive occupant position data from the plurality of sensors, compare the occupant position data to determine if the occupant is seated according to the prescribed seating position, and adjust the at least one actuator to modify the occupant seating position.

According to at least one embodiment, a computer-program product is embodied in a non-transitory computer readable medium that is programmed for automatically adjusting a seat assembly. The computer-program product is provided with instructions for: receiving a data input indicative of occupant anthropometry data, receiving a mode selection input indicative of a selected seat positioning mode, comparing the data input with predetermined data ranges for the selected seat positioning mode, and adjusting at least one of a plurality of settings of the at least one actuator to a predetermined setting based on the predetermined data range.

According to at least another embodiment, a computer-program product is embodied in a non-transitory computer readable medium that is programmed for automatically adjusting a seat assembly. The computer-program product is provided with instructions for: receiving detection data from a plurality of sensors of a seat back of a seat assembly to detect a seating position of an occupant, comparing the detection data to predetermined wellness positioning ranges preselected for posture alignment of ranges of occupant anthropometry data to determine if the occupant is seated according to a prescribed wellness position, and adjusting at least one actuator of a seat back for adjustment of at least one of a plurality of settings of the seat assembly to adjust an occupant seating position to the prescribed wellness position.

According to at least another embodiment, a computer-program product is embodied in a non-transitory computer readable medium that is programmed for automatically adjusting a seat assembly. The computer-program product is provided with instructions for: receiving an occupant data input indicative of occupant anthropometry data, receiving a mode selection input indicative of a selected wellness seat positioning mode, comparing the occupant data input with predetermined wellness positioning ranges preselected for posture alignment of ranges of occupant anthropometry data for the selected seat positioning mode, adjusting at least one of a plurality of settings of at least one seat actuator to a predetermined setting for a prescribed seating position based on the predetermined wellness positioning range, receiving occupant position data from a plurality of sensors of a seat back of a seat assembly to detect a seating position of an occupant, comparing the occupant position data to determine if the occupant is seated according to a prescribed wellness position, and adjusting the at least one actuator to modify the occupant seating position.

According to at least one embodiment, a method for adjusting a seat assembly is provided with a step of receiving a data input indicative of occupant anthropometry data. A mode selection input indicative of a selected seat positioning mode is received. The data input is compared with predetermined data ranges for the selected seat positioning mode. At least one of a plurality of settings of the at least one actuator is adjusted to a predetermined setting based on the predetermined data range.

According to at least another embodiment, a method for adjusting a seat assembly is provided with a step of receiving detection data from a plurality of sensors of a seat back of a seat assembly to detect a seating position of an occupant. The detection data is compared to predetermined wellness positioning ranges preselected for posture alignment of ranges of occupant anthropometry data to determine if the occupant is seated according to a prescribed wellness position. At least one actuator of a seat back is adjusted for adjustment of at least one of a plurality of settings of the seat assembly to adjust an occupant seating position to the prescribed wellness position.

According to at least another embodiment, a method for adjusting a seat assembly is provided with a step of receiving an occupant data input indicative of occupant anthropometry data. A mode selection input indicative of a selected wellness seat positioning mode is received. The occupant data input is compared with predetermined wellness positioning ranges preselected for posture alignment of ranges of occupant anthropometry data for the selected seat positioning mode. At least one of a plurality of settings of at least one seat actuator is adjusted to a predetermined setting for a prescribed seating position based on the predetermined data range. Occupant position data from a plurality of sensors of a seat back of a seat assembly is received to detect a seating position of an occupant. The occupant position data is compared to determine if the occupant is seated according to a prescribed wellness position. The at least one actuator is adjusted to modify the occupant seating position.

BRIEF DESCRIPTION OF THE DRAWINGS

FIG. 5 is another display image for the vehicle seating system of FIG. 4;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies, provides a visual interface with adjustment hardware organically or inorganically. The system may be employed to properly configure any new or existing seating system. The system can also address specific comfort, posture and wellness needs or preferences, such as thoracic support. The seating system objectifies comfort data and biomechanical knowledge to make the data transferable.

The comfort, posture and wellness seating system integrates anthropometry, bio-mechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Figure 1:
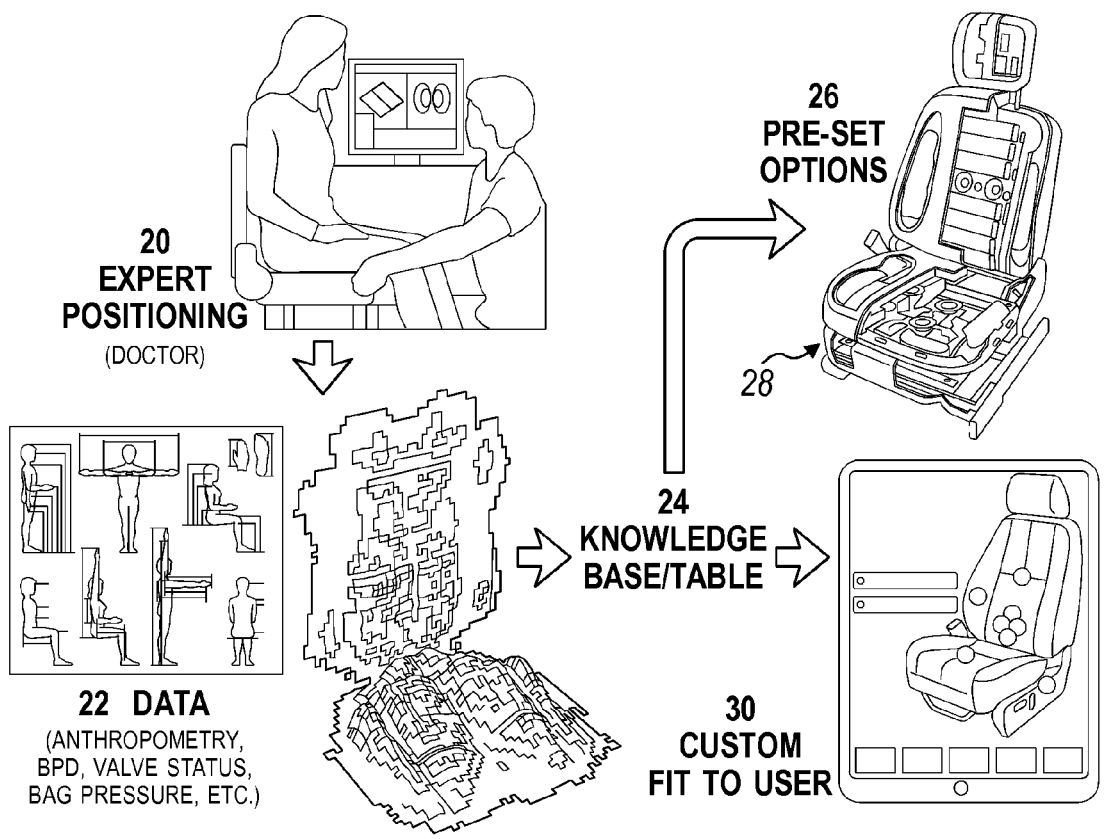
FIG. 1 is a flowchart of a method for determining various adjustment positions of a vehicle seat assembly for various users, according to an embodiment.

Referring now to FIG. 1, a flowchart of a method for determining various adjustment positions of a vehicle seat assembly for various users is illustrated, according to an embodiment. Data collection may occur at block 20. The data collection 20 may include expert positioning of a suitable sample of occupants for optimal comfort, posture and/or wellness by a doctor or chiropractor. The data collection 20 can be used at specific sites on an ongoing basis if required. The expert input provides a high level of expert comfort, posture and wellness fitting.

The data 22 may be based on anthropometry, body pressure distribution (BPD), status of actuators (such as pressure of inflatable air bladders, status of valves or the like), or other data that provides a comfort, posture and wellness position of an adjustable vehicle seat assembly. The data is collected in a knowledge base 24 or table for setting adjustments based on categories of data. The knowledge base 24 may be compiled from the expert positioned data 20 and the occupant specific data 22. The setting adjustments from the knowledge base 24 are utilized for pre-set options 26 in a vehicle seat assembly 28. The setting adjustments 24 can be customized by a user at a controller or display 30.

Figure 2:
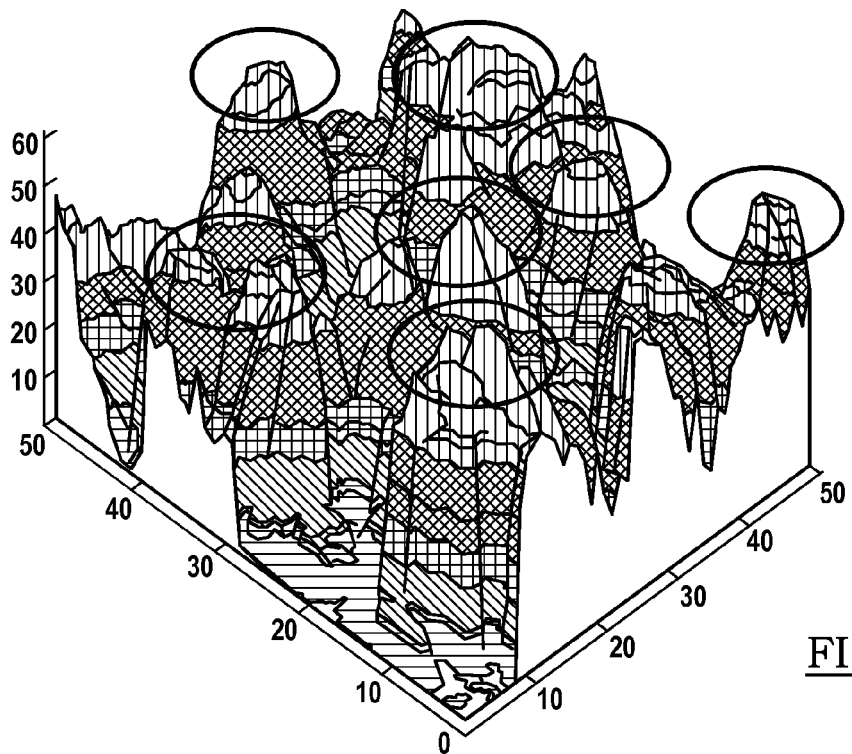
FIG. 2 is a graph of data collected in the method of FIG. 1.

Referring to FIG. 2, input data 20, 22 can be plotted versus adjustment settings 20, 24 for high level categorization. The settings 20, 24 can be categorized by topology clustering for setting the pre-set options 26. Various setting options 26 may be provided for various types of driving. For example a touring setting may provide per package settings and basic comfort, posture and wellness recommendations. The touring setting may also provide optimal visibility, use of features and controls, and the like. A performance setting may be provided for active drivers to provide a more erect position with firmer seating. Additionally, a luxury setting may be more reclined with softer seating.

Figure 3:
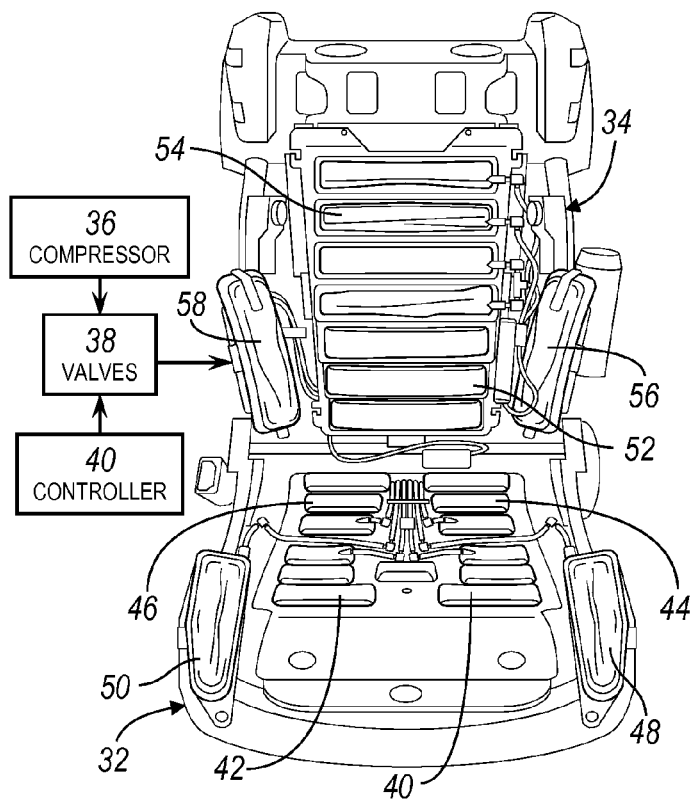
FIG. 3 is a front perspective view of a vehicle seat assembly, illustrated partially disassembled, according to an embodiment.

FIG. 3 illustrates the vehicle seat assembly 28 with a cover removed. The seat assembly 28 includes a seat cushion 32 adapted to be mounted for motor-driven adjustable translation in a fore and aft direction and in an up and down direction of a vehicle. The seat assembly 28 includes a seat back 34 pivotally connected to the seat cushion 32 to extend generally upright relative to the seat cushion 32 for motor-driven pivotal adjustment relative to the seat cushion 32. A head restraint (not shown) is mounted for motor-driven adjustable translation to the seat back 34.

At least one compressor 36 provides a source of air to the seat assembly 28. A plurality of valves 38 receive the compressed air and are controlled by a controller 39 for regulating compressed air into and out of the seat assembly 28. The seat cushion 32 includes a forward left air bladder 40, a forward right air bladder 42, a rear left air bladder 44, a rear right air bladder 46, a left side bolster air bladder 48, and a right side bolster air bladder 50. The seatback 34 includes a plurality of lumbar air bladders 52, a plurality of thoracic air bladders 54, a left side bolster air bladder 56, and a right side bolster air bladder 58. The valves 38 may be provided as a common valve bank that is housed in the seat back 34 or under the seat cushion 32; or the valves 38 may each be provided on each of the air bladders 40, 42, 44, 46, 48, 50, 52, 54, 56, 58. The compressor 36 may be provided in the seat back 34, the seat cushion 32 or concealed within the vehicle body. The controller 39 may be provided in a module under the seat cushion 32, and may be a multifunction controller that also controls other functions in the vehicle.

It is believed that supporting the thoracic region of the spine can reduce forces and support as much as one-third of the upper body mass. By increasing support of the upper body mass, loads are reduced on the muscles, ligaments, vertebrae and discs in the spine and pelvic regions. Decreased load reduces fatigue on these areas of the body. The thoracic air bladders 54 are adjustable to provide the right degree of support in the correct location necessary to reduce such loading.

The controller 39 receives the adjustment settings 24 from pre-set data 26 or from customized data 30. The data may be input from an interface that is provided in the vehicle. The interface may be integrated into the vehicle, such as an instrument panel display that is in suitable wired or wireless communication with the controller 39. The interface may be remote, such as a personal digital assistant (PDA) including phones, tablets and the like. The interface may be provided as a smart phone application, wherein users enter relevant information about themselves. The smart phone interface may not require on-site expertise or seat properties. The remote interface permits a user to transport settings to each vehicle, such as personal passenger vehicles, airline seating, rental cars, and the like.

Figure 4:
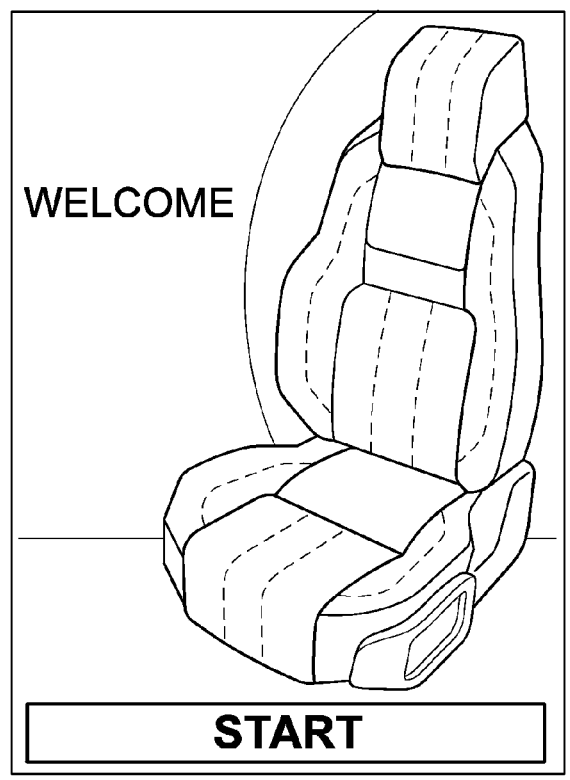
FIG. 4 is a display image for a vehicle seating system according to an embodiment.
Figure 6:
FIG. 6 is another display image for the vehicle seating system of FIG. 4.

FIGS. 4-9 illustrate display images from an interface, such as a tablet. FIG. 4 illustrates a welcome screen wherein a data collection process is initiated. FIGS. 5 and 6 illustrate input screens wherein biometric, personal health and personal preference data, such as height and wellness, is collected. This data is utilized to adjust the seat to the pre-set options 26, based on prior-collected data 22 in knowledge base 24.

Figure 7:
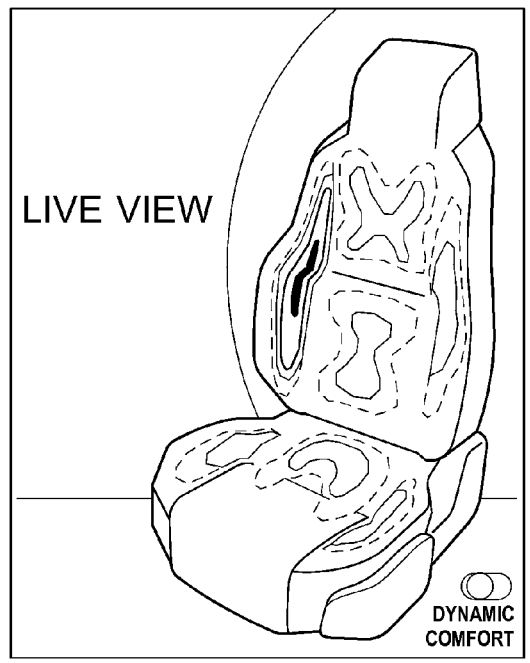
FIG. 7 is another display image for the vehicle seating system of FIG. 4.
Figure 8:
FIG. 8 is another display image for the vehicle seating system of FIG. 4.

Each of the air bladders 40, 42, 44, 46, 48, 50, 52, 54, 56, 58 may include a pressure sensor to detect air pressure in the respective bladder 40, 42, 44, 46, 48, 50, 52, 54, 56, 58. Any pressure sensor is contemplated, such as a pneumatic pressure sensor at the outlet valve of each respective air bladder 40, 42, 44, 46, 48, 50, 52, 54, 56, 58. Pressure can also be sensed by contact pressure sensors disposed in front of or behind some or all of the respective air bladders, including on a front or rear surface thereof. The contact pressure sensors may include pressure-sensing mats, such as those available by Tekscan®, Inc. of 307 West First Street. South Boston, Mass. 02127-1309, USA. FIG. 7 illustrates a depiction of the vehicle seat assembly 28 with zones ranging in color to depict a distribution of pressure upon the seat. This visualization may assist an occupant in positioning upon the seat assembly 28 with live visual feedback.

A dynamic comfort, posture and wellness option is offered. Selection of the dynamic comfort option measures the pressure in the sensors at FIG. 8, and displays a live view as in FIG. 9. The controller 39 compares the sensor values, and if the controller 39 determines that the occupant is not seated evenly, the controller 39 balances the air pressure in opposing air bladders to balance the occupant seating position.

Figure 10:
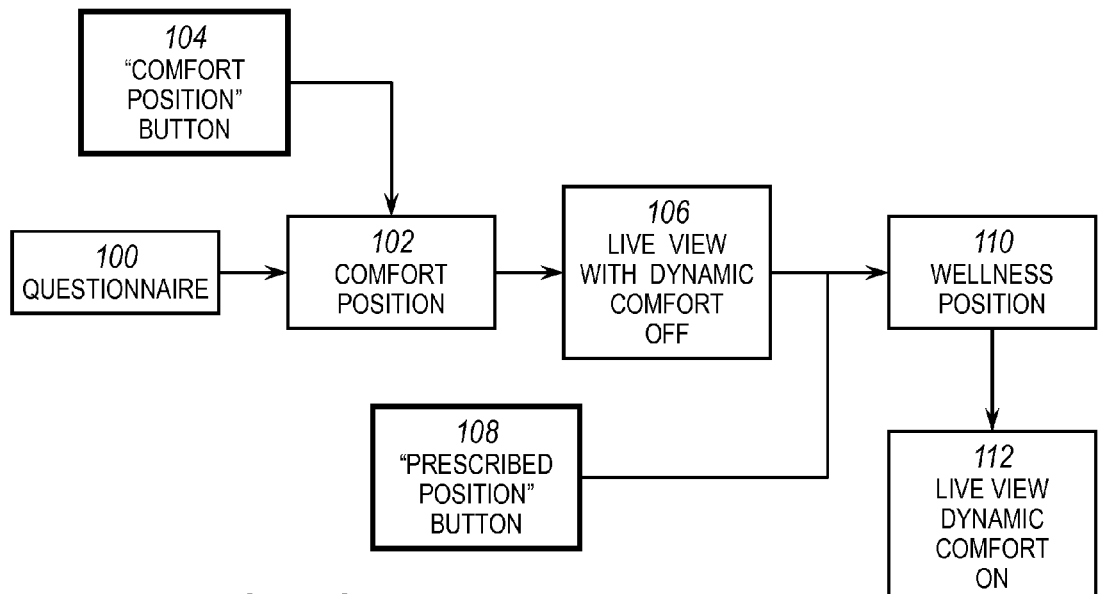
FIG. 10 is a flowchart of a portion of an overall method for adjusting a vehicle seat assembly according to an embodiment.

FIG. 10 depicts a flowchart for a method for adjusting the seat assembly 28 according to an embodiment. At block 100, a questionnaire, such as that illustrated and described above in FIGS. 5 and 6, is completed by the occupant. At block 102, the seat assembly 28 is adjusted to a comfort position. The comfort position is obtained in a comfort mode, as selected by a "comfort position" button at block 104. The "comfort position" button may be selected by default to obtain the comfort position. A collection of individuals were surveyed for comfort preferences and the data is tabulated into comfort seating positions for ranges of anthropometry data. The data received in the questionnaire at block 100 is compared with the predetermined anthropometry data ranges, and the seat assembly 28 is adjusted to a comfort position associated with the corresponding anthropometry data ranges. At block 106, a live view, such as FIG. 7 is generated and displayed.

Figure 9:
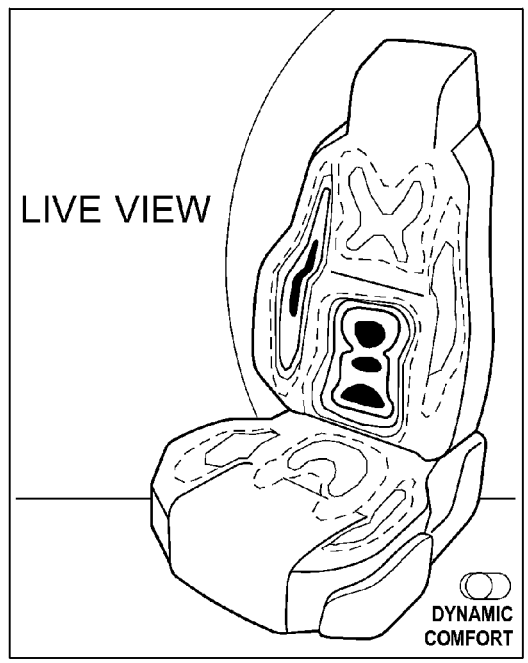
FIG. 9 is another display image for the vehicle seating system of FIG. 4.

Upon occupant selection of a "prescribed position" button and block 108, a wellness mode of the seat assembly 28 is obtained. At block 110, the data received in the questionnaire at block 100 is compared with predetermined anthropometry data ranges. A table of predetermined wellness positions is prescribed by a health professional for optimal posture and wellness of various anthropometry ranges and stored in the controller. A prescribed wellness position is selected associated with the corresponding anthropometry data range for the data received by the occupant at block 110. Then, at block 112, a live view, such as FIG. 9 is displayed. A dynamic comfort mode may be on at this stage, as selected at button 108.

Figure 11:
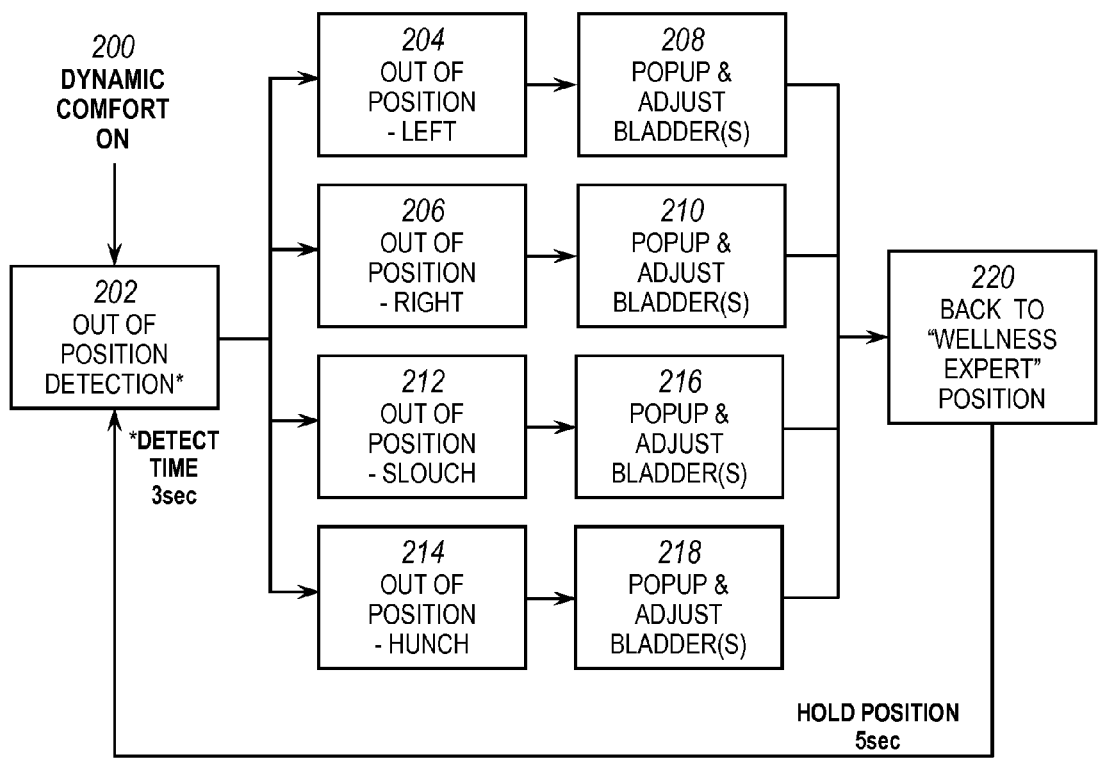
FIG. 11 is a flowchart of another portion of an overall method for adjusting a vehicle seat assembly according to another embodiment.

FIG. 11 illustrates dynamic comfort adjustment of the seat assembly 28 according to an embodiment. At block 200 the dynamic comfort mode is selected. A detect time, three seconds for example, takes measurements at the sensors or sensor mat. At blocks 204 and 206, the sensor values are compared to determine if the occupant is out of the prescribed position from left to right. If so, a popup is provided on the display at block 208 or 210 and the appropriate bladders are adjusted. For example, if the occupant is leaning too far to the left, the additional pressure is detected at block 204, then the message is displayed at block 208 and the left bladders are additionally inflated at block 208. During the left lean, if it is detected that a pressure decrease has occurred in the right bladders at block 206, the message will be displayed at block 210 and the right bladders may be deflated at block 210 to further adjust the left-leaning passenger back to a centered prescribed position. Likewise, these options can work in the opposite order for a passenger leaning to the right.

At blocks 212 and 214, the pressure of the bladders is compared to determine to measure flexure and extension of the center bladders of thoracic, lumbar and sacrum regions. If it is determined that the occupant is slouching relative to the prescribed position at block 212, then a message indicating adjustment is provided in a popup of the display at block 216, and the appropriate bladders are at least partially inflated at block 216. If it is determined that the occupant is hunching relative to the prescribed position at block 214, then the message is provided at block 218 and the central bladders are at least partially deflated at block 218 to return the occupant to the prescribed wellness position.

At block 220, the occupant is returned back to the prescribed or wellness position. To avoid continuous adjustment, a hold position such as five seconds occurs before repeating the sensor detection at block 202.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat cushion adapted to be mounted for translation;
a seat back adapted to be pivotally mounted adjacent the seat cushion;
at least one actuator operably connected to at least one of the seat cushion and the seat back for adjustment of at least one of a plurality of settings of the seat assembly; and
a controller in electrical communication with the at least one actuator and configured to:
receive a data input indicative of occupant anthropometry data,
receive a mode selection input indicative of a selected seat positioning mode,
compare the data input with predetermined data ranges for the selected seat positioning mode, and
adjust at least one of the plurality of settings of the at least one actuator to a predetermined setting based on the predetermined data range.

2. The seat assembly of claim 1 wherein the mode selection input is indicative of a wellness mode; and
wherein the predetermined data ranges for the wellness mode comprise wellness positioning ranges preselected for posture alignment of ranges of occupant anthropometry data.

3. The seat assembly of claim 1 wherein the mode selection input is indicative of a comfort mode; and
wherein the predetermined data ranges for the comfort mode comprise comfort positioning ranges surveyed and tabulated for ranges of occupant anthropometry data.

4. The seat assembly of claim 1 wherein the mode selection input is indicative of at least one of a wellness mode and a comfort mode; and
wherein the predetermined data ranges comprise:
wellness mode positioning ranges preselected for posture alignment of ranges of occupant anthropometry data, and
comfort mode positioning ranges surveyed and tabulated for ranges of occupant anthropometry data.

5. The seat assembly of claim 1 further comprising an interactive user interface in electrical communication with the controller, the interactive user interface being configured to receive the mode selection input from the occupant.

6. The seat assembly of claim 5 further comprising a media device in electrical communication with the controller, wherein the media device provides the interactive user interface.

7. The seat assembly of claim 5 wherein the interactive user interface is configured to:
provide a questionnaire to receive the occupant anthropometry data from the occupant; and
provide a mode selector to receive the selected seat positioning mode from the occupant.

8. The seat assembly of claim 7 wherein the interactive user interface is further configured to:
provide a comfort mode selector; and
provide a wellness mode selector.

9. The seat assembly of claim 8 further comprising:
a plurality of sensors in electrical communication with the controller and operably connected to at least one of the seat cushion and the seat back to detect a seating position of the occupant;
wherein the interactive user interface comprises a display;
wherein the controller is configured to incrementally update the display to provide a visual feedback of a detected seating position; and
wherein the controller is configured to compare the data from the sensors to determine if the occupant is seated evenly, and adjust the at least one actuator to balance an occupant posture seating position when the wellness mode is selected.

10. A seat assembly comprising:
a seat cushion;
a seat back adapted to be mounted adjacent the seat cushion;
a plurality of sensors operably connected to the seat back to detect a seating position of an occupant;
at least one actuator operably connected to the seat back for adjustment of at least one of a plurality of settings of the seat assembly; and
a controller in electrical communication with the plurality of sensors and the at least one actuator, the controller being configured to:
receive detection data from the plurality of sensors,
compare the detection data to predetermined wellness positioning ranges preselected for posture alignment of ranges of occupant anthropometry data to determine if the occupant is seated according to a prescribed wellness position, and
adjust the at least one actuator to adjust an occupant seating position to the prescribed wellness position.

11. The seat assembly of claim 10 wherein the controller is further configured to:
determine if the occupant is seated in a slouch position; and
adjust at least one actuator to inflate the seat back to adjust the occupant seating position to the prescribed wellness position.

12. The seat assembly of claim 10 wherein the controller is further configured to:
determine if the occupant is seated in a hunch position; and
adjust at least one actuator to deflate the seat back to adjust the occupant seating position to the prescribed wellness position.

13. The seat assembly of claim 10 wherein the controller is further configured to:
determine if the occupant is seated in a lean position; and
adjust at least one actuator on a lateral side of the seat to adjust the occupant seating position to the prescribed wellness position.

14. The seat assembly of claim 10 wherein the controller is further configured to:
receive a data input indicative of occupant anthropometry data;
receive a mode selection input indicative of a selected wellness seat positioning mode;
compare the data input with the predetermined wellness positioning data ranges for the selected seat positioning mode; and
adjust at least one of the plurality of settings of the at least one actuator to a predetermined setting based on the predetermined data range.

15. A seat assembly comprising:
a seat cushion adapted to be mounted for translation;
a seat back adapted to be pivotally mounted adjacent the seat cushion;
a plurality of sensors operably connected to at least one of the seat cushion and the seat back to detect a seating position of an occupant;
at least one actuator operably connected to at least one of the seat cushion and the seat back for adjustment of at least one of a plurality of settings of the seat assembly; and
a controller in electrical communication with the plurality of sensors and the at least one actuator, the controller being configured to:
  receive an occupant data input indicative of occupant anthropometry data,
  receive a mode selection input indicative of a selected wellness seat positioning mode,
  compare the occupant data input with predetermined wellness positioning ranges preselected for posture alignment of ranges of occupant anthropometry data for the selected seat positioning mode,
  adjust at least one of the plurality of settings of the at least one actuator to a predetermined setting for a prescribed seating position based on the predetermined wellness positioning range,
  receive occupant position data from the plurality of sensors,
  compare the occupant position data to determine if the occupant is seated according to the prescribed seating position, and
  adjust the at least one actuator to modify the occupant seating position.

16. The seat assembly of claim 15 wherein the at least one actuator comprises:
  a compressor in electrical communication with the controller;
  a plurality of valves in electrical communication with the controller and in fluid communication with the compressor; and
  a plurality of air bladders in fluid communication with the plurality of valves.

17. The seat assembly of claim 15 wherein the plurality of sensors comprise:
  at least one left side sensor; and
  at least one right side sensor.

18. The seat assembly of claim 15 further comprising a media device in electrical communication with the controller, wherein the media device comprises an interactive user interface with a display;
  wherein the controller is configured to:
    incrementally update the display to provide a visual feedback of a detected seating position, and
    provide a message upon the display in response to determining that the occupant is not seated in the prescribed seating position.

19. The seat assembly of claim 15 wherein the controller is further configured to wait a predetermined period of time after adjusting the at least one actuator before receiving updated occupant position data from the plurality of sensors.

20. The seat assembly of claim 15 wherein the controller is further configured to:
  determine if the occupant is seated in a lean position; and
  adjust at least one actuator on a lateral side of the seat to adjust the occupant seating position to the prescribed wellness position.

* * * * *